Figure 1:
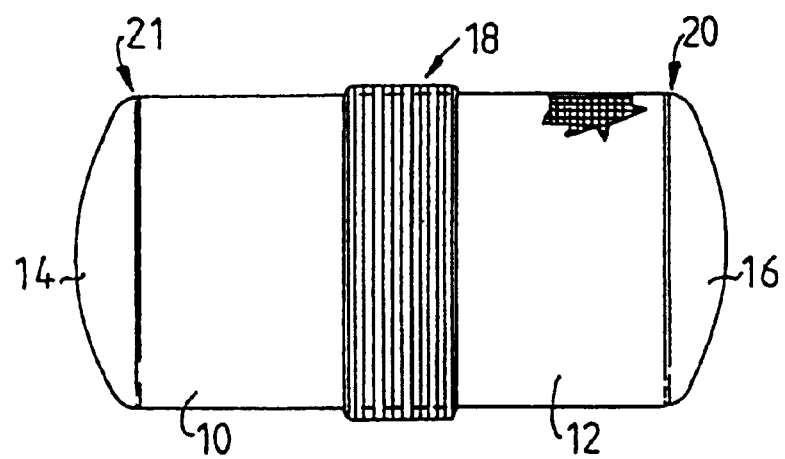

United States Patent [19]
Berglund

[11] Patent Number: 6,145,693
[45] Date of Patent: Nov. 14, 2000

[54] REINFORCED PLASTIC CONTAINER

[75] Inventor: Kurt Berglund, Norrfjarden, Sweden

[73] Assignee: Composite Scandinavia AB, Pitea, Sweden

[21] Appl. No.: 09/297,615

[22] PCT Filed: Nov. 3, 1997

[86] PCT No.: PCT/SE97/01832

§ 371 Date: May 24, 1999

§ 102(e) Date: May 24, 1999

[87] PCT Pub. No.: WO98/20274

PCT Pub. Date: May 14, 1998

[30] Foreign Application Priority Data

Nov. 4, 1996 [SE] Sweden ................................. 9604051

[51] Int. Cl.[7] .................................................. B65D 90/02
[52] U.S. Cl. .......................... 220/589; 220/588; 220/592; 220/565
[58] Field of Search ..................... 220/565, 590, 220/592, 586, 588, 589, 678, 680, DIG. 23, 4.06, 4.13; 156/175, 173, 169, 304.5, 425; 426/258

[56] References Cited

U.S. PATENT DOCUMENTS

| 3,047,191 | 7/1962 | Young | 220/588 |
|---|---|---|---|
| 3,112,234 | 11/1963 | Krupp . | |
| 3,228,549 | 1/1966 | Courtney | 220/589 |
| 5,025,943 | 6/1991 | Forsman | 220/589 |
| 5,385,263 | 1/1995 | Kirk et al. | 220/589 |
| 5,476,189 | 12/1995 | Duvall et al. | 220/590 |
| 5,499,739 | 3/1996 | Greist, III et al. | 220/589 |
| 5,547,533 | 8/1996 | Berglund | 156/175 |
| 5,595,321 | 1/1997 | Berglund | 220/565 |
| 5,698,065 | 12/1997 | Berglund | 156/425 |

FOREIGN PATENT DOCUMENTS

| 2422673 | 12/1974 | Germany | 220/589 |
|---|---|---|---|
| 671922 | 10/1964 | Italy | 220/588 |

OTHER PUBLICATIONS

Filament Winding: its development, manufacture, applications and design; D.V. Rosato and C.S. Grove, Jr.; pp. 216–231, 190–191, 270–271 from Polymer Engineering and Technology.

*Primary Examiner*—Stephen Castellano
*Attorney, Agent, or Firm*—Young & Thompson

[57] ABSTRACT

Glass fiber reinforced plastic container for liquefied petroleum gas or compressed air. The container is made of two halves, the open ends of which are conically chamfered and joined to each other by an adhesive. In each half the reinforcement is made with inner, intermediate and outer layers, which comprise longitudinally as well as transversely and diagonally oriented bundles of reinforcing strands.

7 Claims, 3 Drawing Sheets

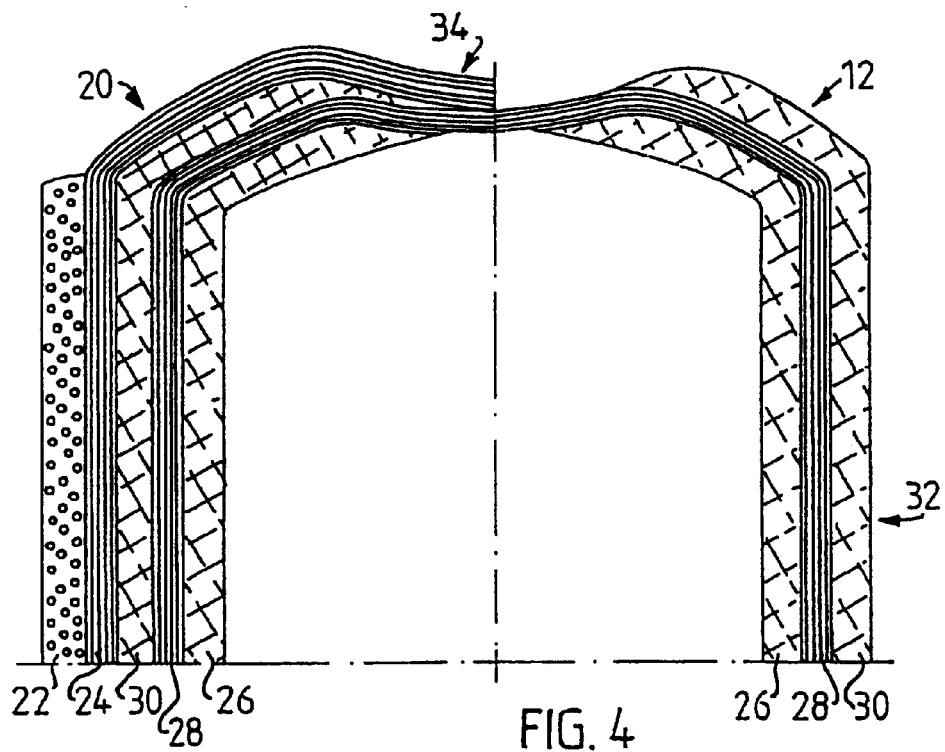
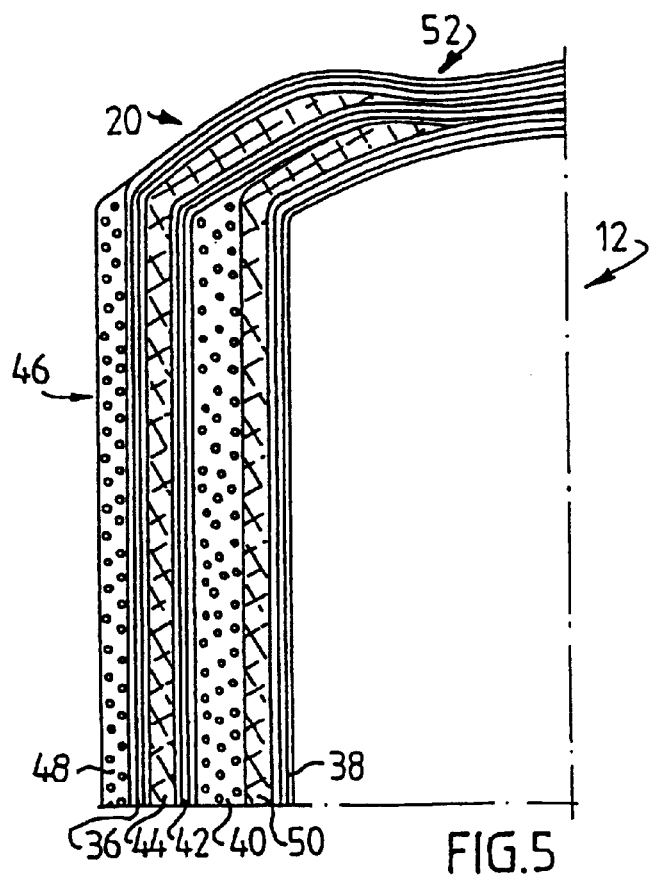

REINFORCED PLASTIC CONTAINER

The present invention relates to a glassfibre-reinforced plastic container for e.g. liquefied petroleum gas or compressed air, a method for manufacturing a reinforcement body therefor and an apparatus for manufacturing reinforced bodies of the type mentioned in the preamble to the following independent claims. Reinforcing strands other than glassfibre strands can also be used.

Swedish patent 9101584-2 describes a glassfibre-reinforced container of the type in question in which the conical joint between the two container halves has a special arrangement of glassfibre reinforcement so that the container will be able to withstand relatively high pressures, up to about 100 bar.

Both container halves in the known tank have outer, inner and intermediate reinforcement layers in which are included densely laid glassfibre strands which as flat-lying bundles of strands form groups of glassfibre strands arranged with intermediate channels, which reinforcing layers are wound according to a mutually predetermined pattern before casting of the container and form a separate reinforcing body which is placed into the mould. These glassfibre strands have, before manufacturing of the reinforcing body, been included in strips of glassfibre bundles, so-called "rovings".

Swedish patent 9101584-2 further describes a method for manufacturing of the reinforcing bodies included in the container halves and a simple device for performing the method.

Each construction has some part which determines the dimensions for the whole construction. In the known container halves it is the joint and the base part with its transition, called shoulder from now on, between the cylindrical surface of the container half and its base. It is therefore desirable to ensure a sufficiently high strength in the base and the shoulder as well as in the cylindrical part without needing for this reason to overdimension any part.

U.S. Pat. No. 3,112,234, for example, suggests, as shown in FIGS. 8–10, that for pressure tanks for airbrakes it can be appropriate to introduce a reinforcing patch in the winding over the shoulder of the container, in order to increase the strength during fastening of e.g. pipe couplings to brake lines. Because only the longitudinal reinforcing strands run over the base of the container half including its shoulder part, through the transverse strands only being able to be wound onto the cylindrical part of the container half, the base and shoulder parts lack strands running in the circumferential direction and therefore do not have as high a strength as the rest of the container.

The object of the present invention is therefore, in a simple and cost-saving way, to provide a container which has a more even distribution of reinforcing layers and which, in each part of the container half has in general reinforcement adapted to the actual strength requirements, and in the shoulder part and a concentric annular part of the gable end in particular, which gives the container an increased impact resistance and permits making holes with sufficiently high remaining strength in the last mentioned part.

This is achieved according to the invention through a reinforced plastic container of the type stated in the introduction which has the features stated in the following independent claims, which involves a new combination of axial winding and tangential winding with a diagonal winding in such a way that the whole of the reinforcing body is further reinforced and an even, similar strength is obtained in the whole of the base part. In this way an optimization of the reinforcement at a finer level than that which is possible with conventional technique, is obtained. Advantageous developments and improvements of the invention are possible through the features stated in the dependent claims.

Suitable embodiments of the container according to the invention are shown as examples on the following schematic drawings and explained more closely in the following description. Furthermore, the method for producing a container half and a reinforcing body according to the invention is described and an embodiment of an apparatus for performing the last mentioned method.

Figure 6:
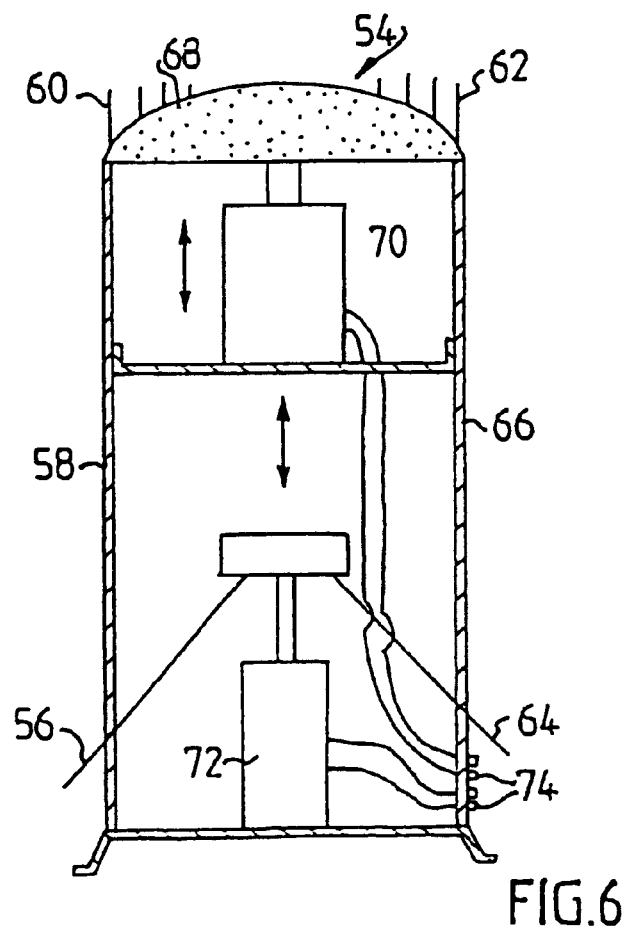
Figure 2:
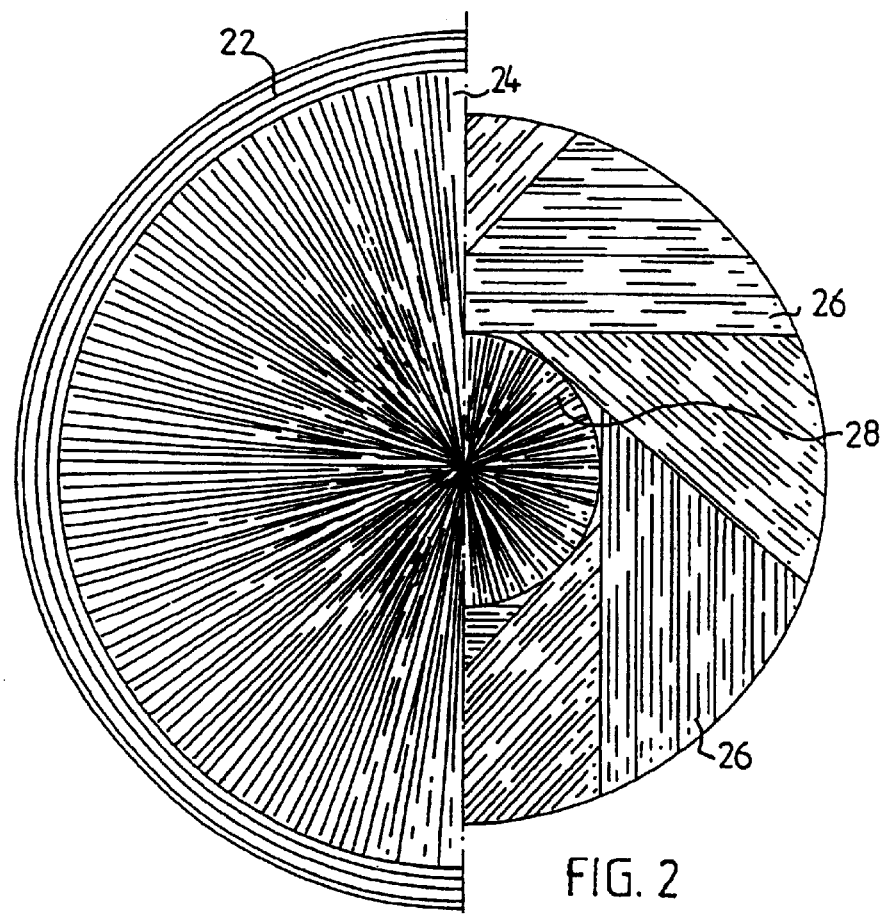
Figure 3:
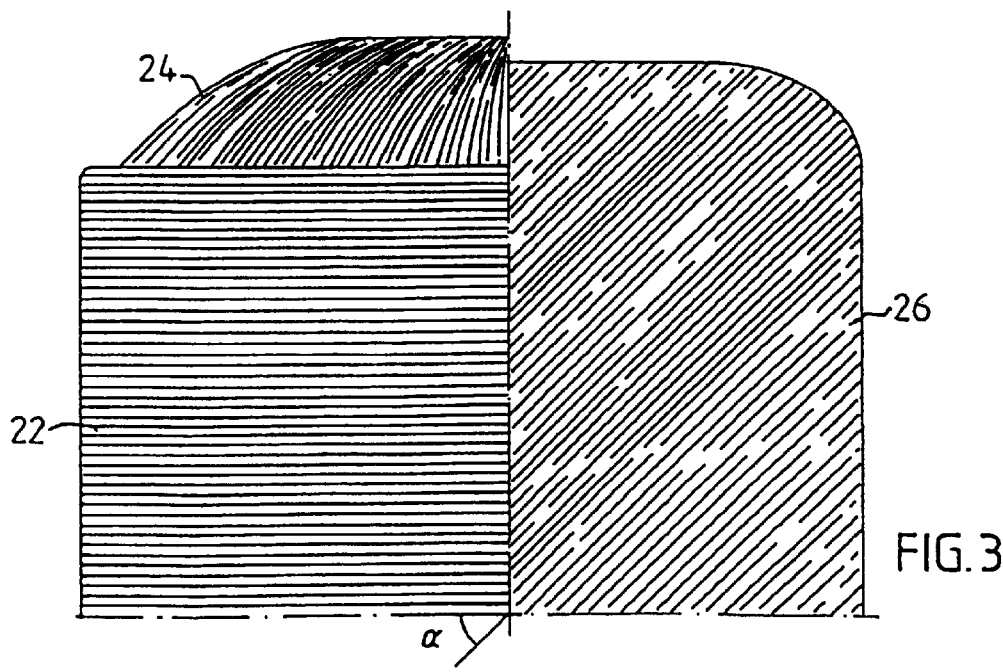

FIG. 1 is a lateral view of the container which is comprised of two glued together cylindrical halves each made in one piece and each having a base, FIG. 2 shows the base part of a right container half according to FIG. 1 seen from the right at an enlarged scale, according to the first embodiment of the invention, where the impregnated plastic is not shown and where the left part of the Figure shows constituent transverse resp. longitudinal bundles of strands in the outer reinforcing layer, while the right side of the Figure shows the base part with the outer layer removed, FIG. 3 shows the base part of the container half according to FIG. 2 in a lateral view, FIG. 4 is a longitudinal view of the base part of the container half according to FIG. 3, FIG. 5 is a longitudinal section of the base part of the container half according to a second embodiment of the invention, FIG. 6 shows schematically in section a preforming tool for manufacturing the reinforcing bodies comprised in the container.

The container in FIG. 1 is made of two cylindrical halves 10,11, which each have a base 14 resp. 16. In a joint 18 between the two halves the end part of the one half 10 is introduced like a male part in the end part of the other half 12 which serves as a female part. In Swedish patent 9101584-2 it is described how the two halves are joined to each other and this is therefore not described more closely here.

The problem which is a basis for the present invention is concentrated on the base part with a shoulder 20,21 of the respective container halves and is consequently the same for both halves. We have chosen to show the half with the female part as an example.

From FIGS. 2–4 the orientation and placement of the constituent reinforcing strands in the container half 12 according to a first embodiment of the invention, are evident.

An outer layer is built up of a number of layers of both transverse 22 and longitudinal strands and an inner layer is built up of a number of layers of both diagonally 26 and longitudinally 28 running reinforcing strands, while an intermediate layer is built up of a number of diagonally running reinforcing strands in a cylindrical part 32 of the container half. The transverse strands 22 in the outer layer extend only to the level of the shoulder 20 while the strands in both the intermediate layer 30 and the inner layer 26,28 extend over the shoulder 20 and also in the radial direction over an end 34 of the base 16 over or near the point of intersection of the centre line with the base, which in the main are along a number of chords at a suitable distance, e.g. 30–50 mm from the centre line. Consequently, the base 14,16 and the shoulder 20, 21 of the respective container halves contain reinforcing strands, both in radial direction and running along chords while lacking transverse reinforcing strands.

From FIG. 5 the orientation and placement of the constituent reinforcing strands in the container half 12 according to a second embodiment of the invention, are evident. In similarity with the known container half an outer layer and an inner layer each contain a number of layers of longitudinal reinforcing strands 36 resp. 38, while on the other hand an intermediate layer is built up of a number of layers of transverse 40 as well as longitudinal 42 and diagonally running 44 reinforcing strands in a cylindrical part 46 of the container half. The outer layer further contains a number of layers of transverse 48 reinforcing strands and the inner layer contains a number of layers of diagonally running 50 reinforcing strands. The transverse reinforcing strands 40 in the intermediate layer extend here also only to the level of the shoulder 20, while both the outer layer and the inner layer as described earlier extend over the shoulder and in the radial direction on the cap 52 over or-near the centre line. However, the diagonally running reinforcing strands 44,50 moreover extend over the shoulder 20 and each bundle of fibres 44,50 follows thereupon essentially a chord over the base 16 of the container half, in a similar way to that in the first embodiment. Further, the respective bundles 44,50 run again over to the opposite cylindrical surface of the container. Consequently, the base 14,16 of the respective container half contains according to this embodiment both reinforcing strands running in the radial direction and reinforcing strands running essentially across these and over the shoulder 20,21 which replace the circumferentially running reinforcing strands in this part.

Each container half is manufactured with the help of a method according to the invention. According to this method, one first builds up several layers of longitudinal, transverse and diagonal glassfibre strands on a core with the help of a robot, whereby a reinforcing body of glassfibre strands is formed. The glassfibre strands constituted in the reinforcing body are fixed in a known manner in relation to each other through spraying on a resin powder slurried with water, whereafter heating takes place also in a known manner in order to bind the glassfibre strands to each other to achieve a finished reinforcing body. This body is placed in a mould which is sealed and melting plastic is then pressed in through the mould gate. The mould is then heated up to 50° C., whereupon the plastic sets and the container half is removed from the tool.

The reinforcing body according to the first embodiment is manufactured through first winding at least one layer of diagonal reinforcing strands close to each other, so-called cross-winding, on a core 54, the preforming tool, wherein a robot first fixes a bundle of reinforcing strands on the first hooking means 56 located next to the lower part of the tool, which bundle subsequently is led diagonally upwards along a path 58 on the tool, with a winding angle α which lies within an interval of 30–50 degrees and preferably is 45 degrees, to the level of its upper, closed end where the fibre bundle by means of the robot is again hooked up on a second hooking means 60, whereupon the fibre bundle is moved essentially along a chord over this end close to the same and then via yet another hooking means 62 downwards along and parallel with an opposing path on the tool, to be hooked up on another first hooking means 64 situated next to the lower part of the tool and opposite the first hooking means. Thereafter one continues to wind the fibre bundles tightly against the previous revolution and hooks up this bundle of fibres on further (not shown) hooking means, whereafter the sequence is repeated a predetermined number of times until a predetermined density between the fibre bundles is achieved and a layer of a predetermined number of layers of fibre bundles is obtained.

Thereafter a layer of longitudinal fibre bundles is wound, which are joined to a group of densely packed bundles of fibres with a predetermined distance between the groups, so that channel-shaped intermediate spaces are formed between them.

Above this layer of longitudinal bundles of fibres a further layer of diagonal bundles of fibres is wound with the same procedure as with the first wound layer.

Above this layer of diagonal bundles of fibres a further layer of longitudinal bundles of fibres is wound according to the same principle as described earlier.

Finally, thereafter a layer of transverse closely lying bundles of fibres is wound on the layer of longitudinal bundles of fibres, which layer in the main is intended to press together the different layers in the reinforcing body.

Each layer is wound with a predetermined number of layers upon each other depending on how large a load the finished container is to withstand in the respective parts.

The reinforcing body according to the second embodiment is wound in a corresponding manner but with a number of different layers and in a different order according to this embodiment.

The male part 10 with the end 20 is manufactured in a corresponding way.

After joining of the two halves into a container through gluing the joint 18 is provided with a heat-insulating and impact-protecting protective sleeve comprising polyurethane foam, which, for example, in the form of a 2 mm thick strip is wound about the joint. The strip is then covered with a covering layer of fibre-reinforced plastic, which can consist of reinforcing strands such as glassfibre strands, which are wound about the joint together with a suitable UV-setting plastic and form the stiff covering layer.

The apparatus for manufacturing the reinforcing bodies included in the container comprises a (not shown) winding robot with injector nozzles for feeding of glassfibre bundles, so-called "rovings", the preforming tool 54, a (not shown) sprayer for spraying of meltable plastic powder slurried in water, and a (not shown) heating chamber for heat-treating of a finished reinforcing body. The preforming tool 54 has a vertical cylinder 66, on the upper annular end of which a cup-shaped cap 68 rests. The cap is connected to a pneumatic cylinder 70, by which the cap 68 is liftable resp. sinkable in the direction of the double arrow for the purpose of facilitating the removal of a finished reinforcing body.

On the upper end of the cylinder 66 shown in the drawing of FIG. 6 the second hooking means 60,62 are fastened, which are parallel with the cylinder and extend out from the end by corresponding openings along the circumference of the cap 68. When the cylinder 70 is operated, the cap 68 is raised or lowered which in turn leads to that the projecting points of the second hooking means 60,62, when the cap is raised, will be hidden inside the cap, while the points will be exposed when the cap is lowered.

In the base part of the tool a further pneumatic cylinder 72 is arranged, whereby the first hooking means 56,64, e.g. steel wires of the bicycle spoke-type, pivotably attached to the piston rod of the cylinder, are able to be retracted resp. extended through openings in the wall of the tool. The fastening points of the hooking means are hereby liftable resp. lowerable in the direction of the smaller double-headed arrow. The respective cylinders are operated via associated pressure lines connected to corresponding compressed air connections 74.

Alternatively, the cylinders 70 and 72 can be formed of a single cylinder which simultaneously moves the cap 68 and the first hooking means 56,64.

The preforming tool functions in such a way that when a reinforcing body is to be wound, the piston rods of the two pneumatic cylinders 70,72 are both retracted. In this way the cap 68 rests on the upper annular end of the cylinder 66 and forms together with the cylinder a core for winding a reinforcing body for a male part or a female part. The second hooking means 60,62 are then exposed and ready for hooking of the fibre bundles which are to be wound to form a fibre body. The pivotably fastened ends of the first hooking means 56,64 attached to the piston rod of the cylinder 72 then are in the lower position. In this position the ends of the means project a predetermined distance outside the lower cylindrical wall part of the tool 54. The fibre bundles are hooked at the winding turning points on the hooking means and guided over and around the core as described earlier. After completed winding and fixing by spraying of plastic powder slurried in water and heat-curing the finished reinforcing body is taken off the tool. To do this, compressed air is connected to the connection 74, which is connected to the pressure side of the cylinder 72, whereby the piston rod of the cylinder is pressed out and the ends of the hooking means 56,64, pivotably fixed to the piston rod, take up their upper position and the projecting ends of the means are drawn in through the openings in the cylindrical wall of the tool 54. Through connecting compressed air to connection 74 which is connected to the cylinder 70, the piston rod is pressed out lifting the the cap 68 from the upper edge of the cylinder. The finished reinforcing body is thus lifted up by the cap 68 so that it is displaced a corresponding distance and liberated thereby from the second hooking means 60,62 and can be lifted off the tool 54 with the help of a conventional gripping means and placed in storage or be further treated directly by trimming the end and grinding the respective conical joint surface for subsequent placement in the mould for casting a container half.

What is claimed is:

1. Plastic container reinforced with glass fiber or corresponding reinforcing strands which has at least one connection opening and consists of two joined together container halves (10,12), which each have an essentially cylindrical part (10,12) and a base (14,16), the open ends of the container halves being conically bevelled and inserted into each other as a male part in a female part and joined by an adhesive, as well as the container halves having different layers comprising essentially longitudinal (24,28; 36,28,42) and essentially transverse (22;40,48) bundles of reinforcing strands, characterized in that each container half has at least a first layer (26,28) which has in the cylindrical part diagonally orientated bundles of strands (26), that each bundle of fibre runs over a transition part (20) between the cylindrical part (10,12) and the base (14,16) and thereafter over the base, essentially along a chord at a predetermined distance from the interception point of the centre line with the base, and further in the reverse order again over the transition part (20) to the opposite side of the cylindrical part (10,12) of the container halves, which pattern is repeated a predetermined number of times on the container half (12) with a predetermined mutual distance between the bundles of strands (26).

2. Reinforced plastic container according to claim 1, characterized in that each bundle of strands (26) which runs over the transition part (20) on opposite sides of the base (14,16) to the cylindrical part (10,12) of the container half is extended to the opposing sides of its open end.

3. Reinforced plastic container according to claim 1, characterized in that the diagonally orientated bundles of strands (26) are wound edge to edge with each other.

4. Reinforced plastic container according to claim 1, characterized in that the diagonally orientated bundles of strands (26) partially overlap each other.

5. Method for producing a reinforced plastic container according to claim 1, characterized in that each diagonally orientated bundle of strands (26) is wound, starting from the open end of the container half, diagonally over its cylindrical part (10,12) and over the transition point (20) to the base (14,16) and over this essentially along the stated chord, whereafter the bundle of strands is wound in the reverse order over the transition part (20) and to the open end of the container half, whereafter the bundle of strands (26) is wound a predetermined distance along the edge of the open end, which pattern is repeated a predetermined number of times on the container half (12).

6. Method for producing a reinforcing body of fibre strands for building into a mould for casting of a reinforced cylinder with one closed end for being constituted in a plastic container according to claim 1, wherein the reinforcing body is built up with the open end facing downwards on a preforming tool (54), through winding on the tool (54) several layers of longitudinally (24,28; 36, 38,42) as well as transversely (22;40,48) and diagonally (26,30;44,50) running reinforcing strands of fibre, whereafter the reinforcing strands constituted in the reinforcing body are sprayed with a meltable plastic powder, which after heat-treating binds the reinforcing strands to each other so that a preformed reinforcing body is formed, characterized in that a bundle of those reinforcing strands which are to be included in the first layer (26,28) as diagonally orientated strands are fixed in the first hooking means (56,64) next to the lower end of the tool (54) and thereafter guided upwards at an angle α relative to the centre line of the container half along a path (58) on the tool to the level of its upper end (68), whereafter the reinforcing strands are guided via second hooking means (60,62) along a chord over this upper end and then in a corresponding way downwards on the opposite longitudinal side of the tool (54), and on this side next to the lower end of the tool fastened again to the opposing first means (56,64), whereafter a new sequence of the bundle is wound in the reverse order tightly close to the already wound bundle, which process is repeated until a predetermined density of windings is obtained and/or a predetermined number of layers of windings has been obtained.

7. Apparatus for performance of the method according to claim 5 for the manufacturing of a reinforcing body of fibre strands for building into a mould for casting of a fibre-reinforced cylinder with one closed end, comprising a winding robot with injector nozzles for feeding fibre bundles, a preforming tool on which a male part or a female part is preformed, a plastic spray for spraying of heat-curable plastic powder and a heat chamber for curing of a complete preform, characterized in that the preforming tool (54) is made of a vertical cylinder (66) with an upper resp. lower end and, in connection to the ends, first (56,64) resp. second (60,62) hooking means, that on the upper annular end rests a vertically movable cup-shaped cap (68), through which the second hooking means (60,62) protrude, that the first hooking means (56,64) are retractably projecting from the lower end, and that both the cap (68) and the first (56,64) hooking means are manoeuverable by means of a manoeuvering arrangement (70,72).

\* \* \* \* \*